United States Patent
Ashton et al.

(10) Patent No.: US 6,181,679 B1
(45) Date of Patent: Jan. 30, 2001

(54) MANAGEMENT OF PACKET TRANSMISSION NETWORKS

(75) Inventors: James Lynn Ashton, Cary; William Notley Maddox; Karl David McCormick, II, both of Raleigh; Robert Davis Porter, Apex; Divakara K. R. Udupa, Durham; Robert Thomas Uthe, Cary, all of NC (US)

(73) Assignee: International Business Machines Corporation, Armonk, NY (US)

( * ) Notice: Under 35 U.S.C. 154(b), the term of this patent shall be extended for 0 days.

(21) Appl. No.: 08/033,599

(22) Filed: Mar. 19, 1993

(51) Int. Cl.[7] .............................. H04J 3/14; H04L 12/56

(52) U.S. Cl. ............................................................ 370/244

(58) Field of Search .......................... 370/60, 94.1, 94.2, 370/16, 110.1, 58.1, 54, 216, 241, 242, 243, 244, 245, 252, 400, 410; 709/223, 224, 225, 226

(56) References Cited

U.S. PATENT DOCUMENTS

| | | | |
|---|---|---|---|
| 4,486,877 | 12/1984 | Turner | 370/15 |
| 4,494,230 | 1/1985 | Turner | 370/60 |
| 4,532,625 | * 7/1985 | Stover | 370/60 |
| 4,551,833 | 11/1985 | Turner | 370/60 |
| 4,768,190 | 8/1988 | Giancarlo | 370/86 |
| 4,878,216 | * 10/1989 | Yunoki | 370/60 |
| 4,920,529 | * 4/1990 | Sasaki | 370/60 |
| 4,984,233 | 1/1991 | Nakayashiki et al. | 370/16 |
| 5,016,243 | 5/1991 | Fite, Jr. | 370/16 |
| 5,029,161 | * 7/1991 | Nagashima | 370/60 |
| 5,276,440 | * 1/1994 | Jolissaint et al. | 370/60 |
| 5,504,921 | * 4/1996 | Dev | 395/800 |

OTHER PUBLICATIONS

"Integrated Services Digital Network (ISDN)—Digital Subscriber Signalling System No. 1 (DSS1)—Signaling Specification for Frame Relay Bearer Service," *American National Standard for Telecommunications ANSI T1.617–1991*, Jun. 18, 1991.

"Integrated Services Digital Network (ISDN)—Core Aspects of Frame Protocol for Use with Frame Relay Bearer Service," *American National Standard for Telecommunications ANSI T1.618–1991*, Jun. 18, 1991.

"Integrated Services Digital Network (ISDN)—Architectural Framework and Service Description for Frame–Relaying Bearer Service," *American National Standard for Telecommunications T1S1/90–175R4*.

(List continued on next page.)

*Primary Examiner*—Huy D. Vu
(74) *Attorney, Agent, or Firm*—John J. Timar

(57) ABSTRACT

A network management system monitors and controls a frame relay network using management information transmitted directly or across the frame relay network itself in network management services vectors intended for the sole purpose of transmitting network management information to the network management system. Newly defined network management major vector formats are used to transmit detailed information concerning both the status of the various virtual circuit segments in the network and the configuration of the switched connections between those segments to form virtual circuits through the network for communication between users of the network. More particularly, status bits are defined to indicate that data links nodes are not supported by adjacent nodes of the network, and status bits to indicate likely physical failures in the hardware used to realize the data links, or logical faults involved in inconsistent indications from adjacent nodes. This status and configuration data is used, in turn, at the network management system to control the network, to diagnose problems, and to effect failure recovery procedures.

7 Claims, 7 Drawing Sheets

OTHER PUBLICATIONS

"Draft New Recomendation Q.922, ISDN Data Link Layer Specification for Frame Mode Bearer Services," *CCITT Recommendation COM XI–R 63–E*, Title page, May 1991.

"The X.25 Interface For Attaching SNA Nodes to Packet–Switched Data Networks—General Information Manual," *IBM Form No. GA27–3345–2*, Third Edition, 1985.

"Planning and Reference for NetView®—Network Control Program—Virtual Telecommunications Access Method," *IBM Form No. SC31–6811–0*, Chapter 1—Introduction, First Edition, pp. 5–14, Dec. 1989.

"A User's Guide to Frame Relay," *Telecommunications*, pp. 39–43, Jul. 1990.

"Frame Relay Networks: Not as Simple as They Seem," *Data Communications*, pp. 109–114, Dec. 1990.

"User–To–User Control," *CCITT Recomendation COM XI–R 133E*, Title page, Oct. 1991.

"Management Services Major Vectors," *System Network Architecture—Formats*, Chapter 9, IBM Form No. GA27–3136–11, 12th Edition, May 1991.

W. S. Hobgood, "The Role of the Network Control Program in Systems Network Architecture," *IBM Systems Journal*, vol. 15, No. 1, pp. 39–52, 1976.

H. R. Albrecht and K. D. Ryder, "The Virtual Telecommunications Access Method: A Systems Network Architecture Perspective," *IBM Systems Journal*, vol. 15, No. 1, pp. 53–80, 1976.

\* cited by examiner

```
/* To parse the subvector X'52' */

IF (MSUSEG (0000.52.07 7) = HEX('01') |
    MSUSEG (1332.52.07 7) = HEX('01')) &
   (MSUSEG (0000.52.0E) ¬= " |
    MSUSEG (0000.52.0F) ¬= " |
    MSUSEG (1332.52.0E) ¬= " |
    MSUSEG (1332.52.0F) ¬= ") THEN
   BEGIN;
      IF (MSUSEG (0000.52.07 3) = HEX(NAMDLCI1) |
          MSUSEG (1332.52.07 3) = HEX(NAMDLCI2)) &
         (MSUSEG (0000) = HEX(NAMDLCI3) |
          MSUSEG (1332) = HEX(NAMEDLCI4)) &
          HIER = HEX(HIERLIST) THEN
             EXEC (CMD('CNMCFRRL' 'NAMDLCI1' 'NAMDLCI2'
                       'NAMDLCI3' 'NAMDLCI4' ' HIERLIST')) ;
   END;
```

MANAGEMENT OF PACKET TRANSMISSION NETWORKS

TECHNICAL FIELD

This invention relates to packet transmission networks and, more particularly, to the central management of such networks.

BACKGROUND OF THE INVENTION

It has become commonplace to use packet communications networks to interconnect digital data users at geographically separated locations. Local area networks (LANs) such as token rings or ETHERNET® are used to interconnect users within relatively confined localities while wide area networks (WANs) such as the Integrated Services Data Network (ISDN), frame relay networks and cell relay networks such as Asynchronous Transfer Mode (ATM) networks, are used to interconnect users disbursed over a wider geographical area. Indeed, a WAN can be used to interconnect a plurality of LANs. All such communications networks must be supervised, managed and controlled to prevent congestion, to compensate for hardware or software failures, and to meet the quality of service requirements of the users. These requirements involve the detection of network failures, the diagnosis of the problem and the implementation of problem recovery procedures. The system responsible for such problem detection, diagnosis and recovery is commonly known as a network management system. One such network management system is the IBM NetView® system disclosed in "Planning and Reference for NetView®—Network Control Program—Virtual Telecommunications Access Method," IBM Form Number SC31-6881-0, December 1989.

The availability of fiber optic transmission media has significantly reduced the transmission error rate in high speed packet networks. The need for self-correcting transmission protocols operating over every transmission link such as X.25 has therefore decreased and faster packet switching protocols such as frame relay are becoming more common. As described in ANSI Standards T1.617-1991 and T1.618-1991 (and the corresponding international CCITT Standards COM XI-R 63-E and COM XI-R 133-E), in the frame relay technology, the user data is packaged in a frame relay frame bounded with delimiter flags and including an address or routing header and a frame error checking trailer. Such frames accept originating user data packets of any size (within limits) at an originating edge node of the packet network, transmit the packets across the frame relay network, and deliver these packets to the user connected to the destination edge node of the packet network. In order to accomplish frame routing, virtual circuits are defined extending from the originating node to the destination node and comprising virtual circuit segments extending between adjacent switching nodes along the route. The physical transmission medium between nodes is assigned, in advance, to a wide variety of virtual circuits, using statistical multiplexing techniques to accommodate a far larger number of virtual circuit segments to the transmission medium that could be accommodated at one time, relying on the bursty nature of digital data traffic. Such virtual circuits can be assigned to dedicated transmission facilities or to switched (dial-up) transmission facilities, and can be assigned permanently to a source-destination pair or assigned dynamically for only the duration of a single connection.

The routing information in the frame relay frame header identifies, at each node, the appropriate virtual circuit segments required to deliver the frame from the source node through the network to the destination node. The same virtual circuit is utilized throughout the duration of the data connection. That is, the assigned segments are always used to complete the particular connection even though bandwidth in the same transmission facilities might simultaneously be assigned as virtual circuit segments to other virtual circuit connections between other users and will be seized, when required, to complete such other connections. When a virtual circuit segment is no longer used by a first virtual circuit connection, the bandwidth is then available for virtual circuit segments of other virtual circuit connections.

Network management services for high speed packet communication networks require the generation of large amounts of information about the status of the virtual circuit segments at each node of the network and the configuration of the switched cross-connections between adjacent virtual circuit segments terminating at the same switching node. Moreover, such status and configuration data must be delivered to the network management system. Such status and configuration information, then, is generated at each of the nodes of the network and delivered, directly or over the network itself, to a network management system attached to one node of the network. In a frame relay network, the status and configuration information from nodes remote from the network management system endnode must be packaged in a frame relay format which can be transmitted across the network to the frame management system. Such management services data has been packaged in a format called a network management vector transport (NMVT). Similar data formats must be provided for network protocols other than the frame relay protocol.

Network management vector transport frames generally comprise a major status vector which, in turn, is comprised of a plurality of status or configuration subvectors each of which includes a plurality of subfields. Each major vector, subvector and subfield is preceded by a header comprising a length field, specifying the length, in bytes, of the corresponding vector, subvector or field, a key field, identifying the information in the vector, subvector or subfield, and the specific status or configuration information itself. Moreover, NMVT major vectors, subvectors and subfields can be repeated a plurality of times in the NMVT, permitting high density packing of management information in the NMVTs.

A large number of major vectors, subvectors and subfields have been defined in "Management Services Major Vectors," *System Network Architecture—Formats,* Chapter 9, IBM Form Number GA27-3136-11, 12th Edition, May 1991. Adequate information about the status and configuration of the individual virtual circuit segments terminating at a particular node of the network, however, are not provided by the prior art management services vectors. In particular, under prior art network architecture, a virtual circuit extended only for a single segment and there was no need for status and configuration data regarding virtual circuits extending across more than segment between three or more nodes. It is therefore desirable to expand the prior art status information concerning the status of virtual circuit segments.

SUMMARY OF THE INVENTION

In accordance with the illustrative embodiment of the present invention, a packet network management system is provided which cooperates with a plurality of management information vectors originating in the various nodes of the network. The network management system provides a mechanism for storing and displaying the status and configuration of all of the resources of the packet network, for responding both automatically and manually to faults and failures in the system, and for permitting operating personnel to invoke commands which query the various network resources for their current status and configuration, and restructure the network resources to accommodate expansion or reduction of those resources.

More particularly, new management services major vector formats are defined for specifying, in great detail, the status of all of the individual virtual circuit segments (called "data links") terminating at each node of the network, and another vector format for specifying the configuration of the virtual circuit segment interconnections of all of the individual virtual circuit segments terminating at each such node. Such virtual circuit segments, identified by Data Link Connection Identifiers (DLCIs), comprise a single segment of the multisegment virtual circuits interconnecting the end nodes of the network. In order to more accurately reflect the individual segment characteristics, two new data bits have been added to the DCLI status field, the "F" and the "U" bits. The "F" bit indicates that the virtual circuit segment has failed, due either to a hardware failure or a software fault. The "F" bit is used by a network management system to remove the failed segments from service and to permit the substitution of a segment which is operative. The "U" bit indicates whether or not the adjacent node supports the virtual circuit segment identified in this node. This "U" bit is used by the network management system to detect virtual circuit segments which are not supported remotely and which hence are not available for assignment.

Another feature of the present invention is the provision of another new management services vector format for specifying the configuration of the inter-segment connections effected at a node, and permitting the specification of alternate inter-segment connections at the node. The inter-segment connections can be checked by the network management system to determine if the virtual circuit is complete and correct, and to permit rapid and accurate establishment of alternate route virtual circuit connections between nodes in the face of failures in the virtual circuit segments.

In accordance with another feature of the present invention, the response of the network management system to the various status and configuration data collected from the nodes of the system is controlled by an automation table which detects the fault or failure in a virtual circuit segment and reponds automatically to such faults or failures by either taking action directly to alter the configuration of the network, or by alerting personnel to take such action, displaying appropriate information for guiding such action. In a modern network with hundreds, or even thousands of nodes, and a correspondingly large number of user terminals, it is essential that tools be supplied to aid in the management of such networks. The present invention supplies such tools for large networks and enables the timely and accurate management of the resources of the network.

The network management system according to the present invention has the advantages of permitting detailed control over the various resources of the packet communications system to which it is connected with a systematic approach to the collection and storage of system information. With a properly prepared automation table, this collection of system information can be used to automatically control many of the aspects of the packet system without intervention by the operating personnel. Moreover, the automation table provides users of the system with a tool for customizing the management of that portion of the system utilized by that user independently of the management of other portions of the system utilized by other users.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
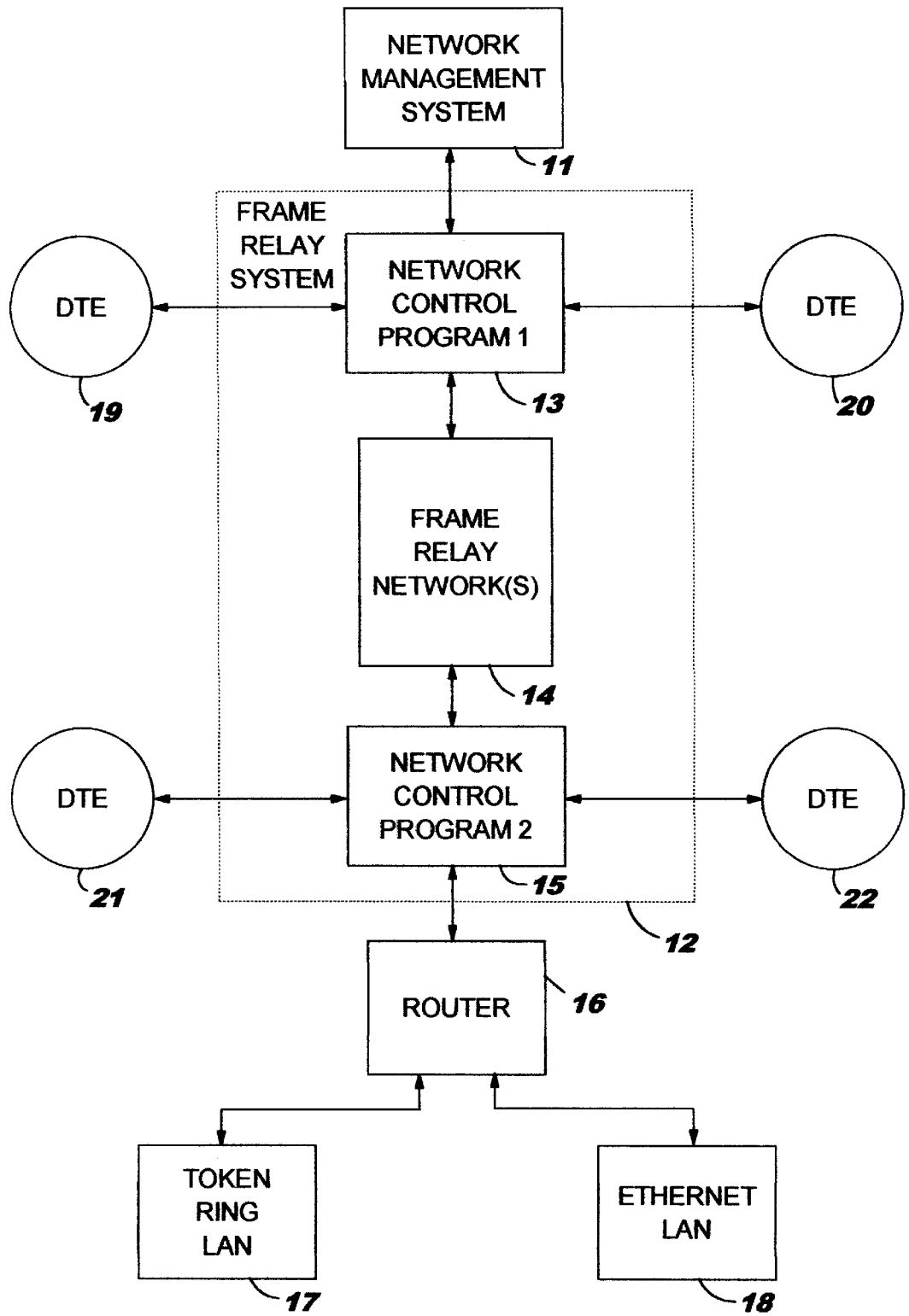
FIG. 1 shows a general block diagram of a high speed packet communications system with a network management system in which the present invention may find use.

Referring more particularly to FIG. 1, there is shown a general block diagram of a high speed packet communications system in which the network management system of the present invention might find use. For the purposes of illustration, the network 12 of FIG. 1 is shown as a frame relay network. It is to be noted, however, that network management system 11 of the present invention can also find use in other types of high speed packet networks 12 such as Integrated Services Data Networks (ISDN) or Asynchonous Transfer Mode (ATM) networks. The modifications necessary to utilize the network management system 11 of the present invention with networks other than frame relay networks will be obvious to those skilled in this art and will not be described in detail here.

In FIG. 1, the frame relay system 12 comprises one or more public frame relay networks 14 having, as an example, Network Control Programs (NCPs) 13 and 15, as nodes in the networks, or any other high speed packet network nodes currently available. The NCPs, in turn, are computer processes executed on computer hardware such as the IBM 3745 Communications Controller computer or other equivalent computers. The Network Control Program is described in "The Role of the Network Control Program in Systems Network Architecture," by W. S. Hobgood, *IBM Systems Journal,* Vol. 15, No. 1, pages 39–52, 1976.

The NCP nodes are interconnected by high speed transmission facilities such as coaxial cable, microwave links or optical fibers to form a highly interconnected network providing redundant pathways between the various users connected to nodes of the network. Network user facilities such as data terminal equipment (DTE) 19, 20, 21 and 22 are connected to network 12 by way of user access edge nodes such as nodes 13 and 15 of network 12. DTEs 19–22 may comprise simple user workstations, highly sophisticated data processing systems, or any other type of data processing facilities. Indeed, a router circuit 16 may be used to connect local area networks (LANs) such as token ring network 17 and ETHERNET® network 18 to the frame relay network 12. Network management system 11 is likewise connected to one node (node 13) of the frame relay network much like any other DTE attached to the network.

Frame relay network 12 is distinguished by virtually error-free transmission of data packets, reducing the need for error correction facilities such as those embodied in the X.25 protocols disclosed in "The X.25 Interface for Attaching SNA Nodes to Packet-Switched Data Networks—General Information Manual," IBM Form Number GA27-3345-2, Third Edition, 1985. As will be described in connection with FIG. 5, data received from terminal facilities such as DTEs 19–22 or router 16 is encapsulated in a frame relay frame in which the user data has appended thereto a header containing address information and a trailer having error correction data contained therein. No modifications are made to the user data other than the appended header and trailer, thus making the encapsulating process very rapid and permitting very large throughput. The network nodes themselves also generate frames of data containing network management information (called network management major vectors) which are transmitted directly through the network to network management system 11. In accordance with the present invention, management system 11 utilizes these network management major vectors to manage the traffic flowing through and configuration of network 12, preventing congestion, accommodating node and transmission facility outages and reacting to changes in the topology of the network. The network management system 11 can be used to manage both the hardware circuits and the virtual circuits at each of the nodes of network 12. The NCP processes used to connect the virtual circuit appearances at the node to local user facilities are called the Frame Relay Terminating Equipment (FRTE), while the NCP process used to control the virtual circuit connections through the node and thence to other nodes are called the Frame Relay Switching Equipment (FRSE) or frame handler. Both the FRTE and the FRSE processes are also capable of generating network management major vectors which are transmitted to network management system 11. System 11 utilizes these major vectors to manage the functions of both the FRTE and the FRSE.

Figure 2:
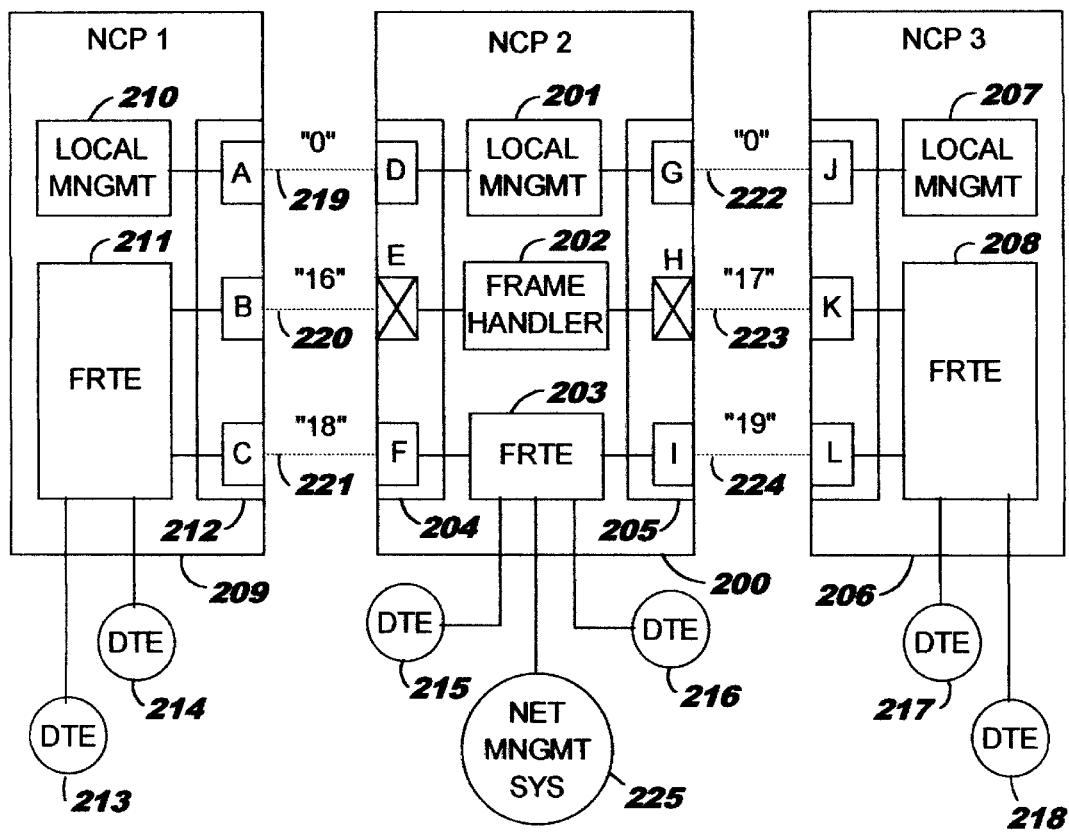
FIG. 2 shows a more specific block diagram of a simplified packet communications system illustrating virtual circuit connections and virtual circuit segments used to connect users of the system.

Before proceeding to a detailed description of the network management system 11 of FIG. 1, the detailed organization and operation of the nodes of the frame relay network 12 will be described in more detail. In FIG. 2 there is shown a more detailed block diagram of a simplified three-node frame relay system illustrating the virtual circuit concept used to route packets through a frame relay network. The frame relay network of FIG. 2 comprises three NCP nodes 200, 206 and 209 interconnected by transmission facilities which may be permanent or switched, coaxial, microwave, optic fiber or other broadband transmission facilities. Each of the NCPs 200, 206 and 209 is equipped with processes to handle local connection terminations (FRTE) 203, 208 and 211, respectively, and local node management 201, 207 and 210, respectively. Those NCP nodes which provide flow through traffic (not terminating at that node), such as NCP node 200 in FIG. 2, also includes a frame handler 202 (also termed Frame Relay Switching Equipment, FRSE) used to interconnect the virtual circuits which do not terminate in node 200, but which must be connected through node 200 to node 206 or 209. The transmission facility connecting node 200 and node 206 appears at port 205 in node 200 and at port 210 in node 206. Similarly, the transmission facility connecting node 200 to node 209 appears at port 204 in node 200 at at port 212 in node 209. Each of nodes 200, 206 and 209 will in reality include a large plurality of ports representing local appearances of transmission facilities to many other nodes of an actual packet network. The illustration of FIG. 2 has been limited to three nodes and two transmission facilities for simplicity alone and does not represent a likely network architecture.

Within each of ports 212, 204, 205 and 210 are a plurality of subports, subports A, B and C in port 212, subports D, E and F in port 204, subports G, H and I in port 205 and subports J, K and L in port 210. These subports A–L represent local appearances of virtual circuit segments extending between adjacent nodes. These subports are not appearances of physical channels in the transmission facility, but instead are appearances of logical virtual circuit segments which are implemented, when required, within the bandwidth provided by the physical transmission facility. Only a subset of such virtual circuits can be active at any one time since the virtual circuits are assigned in accordance with statistical multiplexing principles and hence the total assigned virtual circuit bandwidth exceeds the available physical bandwidth.

Connected to the FRTE 211 of node 209 are user DTEs 213 and 214. Similarly, user DTEs 217 and 218 are connected to FRTE 208 in node 206. Finally, user DTEs 215 and 216 are connected to FRTE 203 in node 200. Network management system 225 (corresponding to network management system 11 in FIG. 1) is also connected to FRTE 203 in node 200. In order to connect DTE 214 to DTE 215, a virtual circuit is defined between subport C in port 212 and subport F in port 204. FRTEs 211 and 203 complete the connections to the DTEs 214 and 215. The virtual circuit segment 221 extending between subports C and F is called a Data Link Connection and is identified by a Data Link Connection Identifier (DLCI) "18." Similarly, DTEs 216 and 217 are connected through subports I and L of ports 205 and 210, respectively, using the FRTEs 203 and 208 and the virtual circuit segment 224, identified as DLCI "19." Note that the DLCIs are selected from a fixed set of DLCIs duplicated in each of the nodes. Thus the assignment of the same DLCI in two adjacent nodes to the same virtual circuit constitutes the assignment of that virtual circuit segment to a particular connection.

If it is desired to connect DTE 213 to DTE 218, a virtual circuit must be defined which spans more than one segment. In particular, the virtual circuit to connect DTE 213 to DTE 218 involves FRTE 211, subport B of port 212 in node 209, DLCI 220 ("16"), subport E of port 204 in node 200, frame handler 202 in node 200, subport H of port 205 in node 200, DLCI 223 ("17"), subport K of port 210 in node 206 and FRTE 208 in node 206. It is to be noted that the only function that need be performed by the frame handler 202 in node 200 is to forward the frame from subport E to subport H in response to the virtual circuit identification in the header of the frame. The virtual circuit identification, of course, corresponds to the source-destination pair of user DTEs 213 and 218. It is this low level forwarding of data frames which gives the frame relay technology its name and is responsible for the high throughput of the network.

In order to manage the DLCIs extending between adjacent nodes, a local management process 210 in node 209 exchanges DLCI status information with the local management process 201 in adjacent node 200. Similarly, local management process 201 exchanges DLCI status information with the local management process 207 in node 206. The exchange of local management status information takes place over a dedicated virtual circuit extending between adjacent nodes, i.e., virtual circuit 219 between nodes 209 and 200 and virtual circuit 222 between nodes 200 and 206. Virtual circuits 219 and 222 are identified by DLCIs "0" under the international standard. Each of the local management processes 210, 201 and 207 also generates a major vector containing status information concerning all of the DLCIs having appearances at the respective node and the network management processes use the information in these major vectors to manage the virtual circuits. In accordance with the present invention, these major vectors are transmitted to the network management system 225 connected to node 200. Locally generated major vectors are transmitted directly to system 225 while major vectors generated at remote nodes (nodes 209 and 206 in FIG. 2) are transmitted on virtual circuits set up for that purposes and utilizing the frame relay format. In actual frame relay networks, the network management vectors are often transmitted on virtual circuits having many inter-node segments.

It will be noted that those of subports A–L participating in multi-segment virtual circuits, and hence requiring the services of the frame handler 202 for switching between subports, are identified by "Xs" in the subport box. Although only one pair of subports E and H are so indicated in FIG. 2, that is only because of the simplifying assumption and the typical frame relay network would involve a great many more switched subports.

Figure 3:
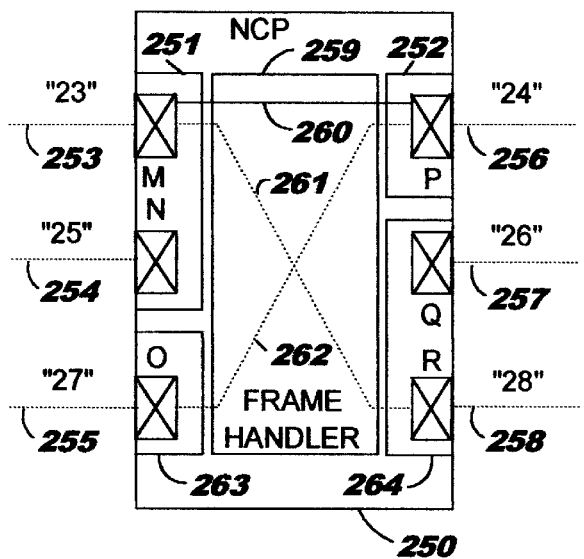
FIG. 3 is block diagram of a single node of a packet transmission system for illustrating the configuration of cross-connections effected at such a node to implement multi-segment virtual circuits with alternate routing provisions.

In FIG. 3 there is shown a graphic representation of one NCP node 250 of a frame relay network such as network 12 of FIG. 1. In FIG. 3, the assignment of substitute virtual circuit segments is illustrated. Such substitute segments are used to implement redundant or alternate routes between DTEs. In FIG. 3, the normal virtual circuit connection utilizes a connection 260, implemented by frame handler 259, between subport M in port 251 and subport P in port 252. Subport M represents the appearance at node 250 of the virtual circuit segment 253, having a DLCI "23" while subport P represents the appearance at node 250 of the virtual circuit segment 256 having a DLCI "24." In order to improve the reliability of the virtual circuit, at the time the virtual circuit is defined, one or more redundant virtual circuits can be assigned for some or all of the connections. In FIG. 3, a substitute connection 261 can be defined through frame handler 259 from subport M of port 251 to subport R of port 264, and another substitute connection 262 defined through frame handler 259 from subport P of port 252 to subport O of port 263. Subport R represents the appearance of virtual circuit segment 258 (DLCI "28") and subport O represents the appearance of virtual circuit segment 255 (DLCI "27"). By defining such substitute virtual circuit connections at the time the normal virtual circuit is defined, a mechanism is available for rerouting traffic either automatically or manually by network management personnel. In accordance with the present invention, configuration information representing the normal and the substitute connections, and which of these connections is currently activated, is stored in a network management major vector and delivered to the network management system (11 in FIG. 1; 225 in FIG. 2) to be used to manage the redundant pathways.

Figure 4:
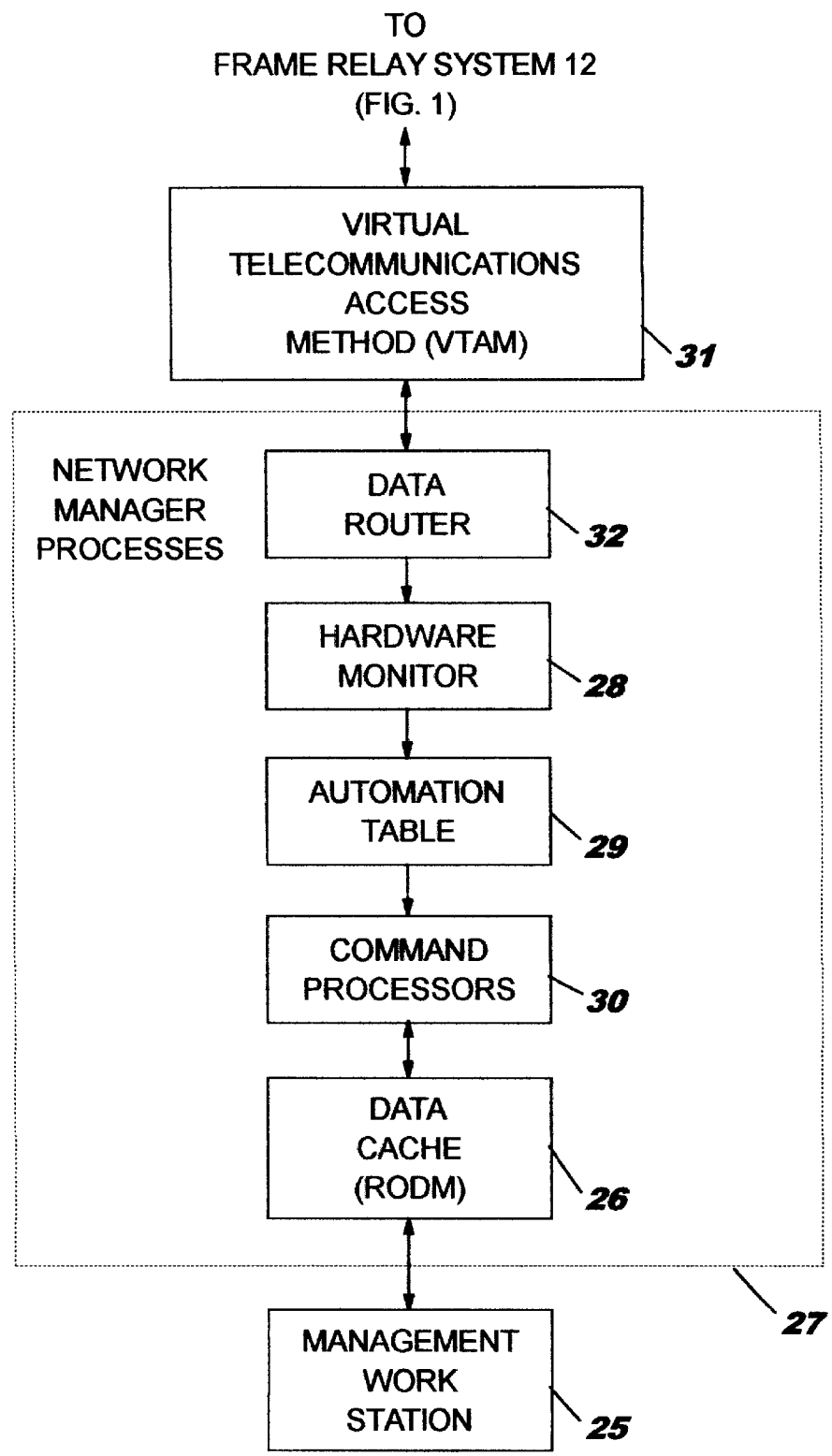
FIG. 4 shows a general block diagram of a network management system in accordance with the present invention.

In FIG. 4 there is shown a detailed block diagram of the network management system 11 of FIG. 1 and system 225 in FIG. 2. The network management system of the present invention can be implemented as an improvement in the NetView® system referred to above, or may be implemented as an entirely new management facility. In any event, the network management system of FIG. 1 or 2 is preferably implemented by programming a general purpose host computer. In the network management system of FIG. 2, a process known as a Virtual Telecommunications Access Method (VTAM) 31 is used to interface between the network 12 of FIG. 1 and the balance of the network management system. VTAM 31 provides the translations necessary to translate the network management major vectors from the frame relay network 12 into signals usable by the network manager processes 27 in FIG. 2. Such a VTAM process is described in "The Virtual Telecommunications Access Method: A Systems Network Architecture Perspective," by H. R. Albrecht and K. D. Ryder, *IBM Systems Journal*, Vol. 15, No. 1, pages 53–80, 1976. More particularly, all network management major vectors received by VTAM 31 are applied to data router 32. Data router 32 utilizes the major vector key field to route the major vector to the appropriate network management processes in system 27 such as a hardware monitor 28. In hardware monitor 28, these vectors are received and disassembled to retrieve the detailed network management information embedded in the major vectors. An automation table 29 is then used to provide the software command scripts necessary to process the information received by the hardware monitor 28. Command processors 30 are used to process the commands delivered by automation table 29 or by messages from remote user locations, and to carry out network management processes permitted or required by the information delivered by the management transport vectors. A status and configuration cache 26 comprising, for example, a Resource Object Data Manager (RODM), is used to store the management information concerning the current status of the network 12 of FIG. 1. This information is used, inter alia, to maintain an up-to-date view of the network status or configuration on management workstation 25. Indeed, the information in cache 26 can be accessed selectively by workstation 25 to display any one of a large plurality of views of the network status which, in turn, can be used to support the intervention of the network management personnel in the operation of the network when such intervention is justified. Various automatic responses to network status information are also supported by automation table 29 and command processors 30. Indeed, one of the primary purposes of the present invention is to provide a generic environment for the management of high speed packet communications networks. The organization of FIG. 2 contributes considerably to this generic ability to respond to network management data. In addition, the automation table 29 provides a mechanism for customizing the management of the network for each separate user and, indeed, provides a mechanism to allow the user himself to control the management decisions by providing appropriate scripts for the automation table.

It will be noted that the components 26, 29 and 30 of the network management system of FIG. 4 are preferably implemented by means of programmed processes executing on a host computer 27. The functions performed by the components 26, 29 and 30 can, of course, also be implemented by special purpose hardware designed to carry out these functions. The ability to readily alter a software implementation is a considerable advantage, however, when implementing processes which must interact with a plurality of different high speed packet communications networks.

Figure 5:
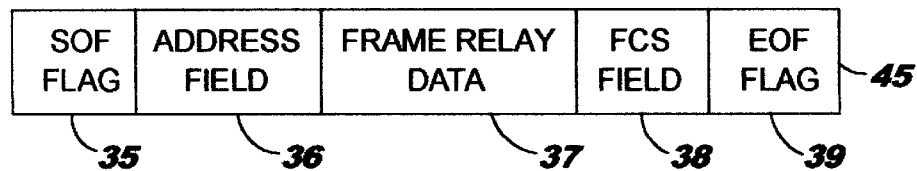
FIG. 5 shows a graphical representation of the frame relay format used for transmitting both user data and network management data across a frame relay network.

In FIG. 5 there is shown a graphical representation of a standard variable length frame relay frame in which the user data is embedded in the frame relay field 37. To this user data is added a header consisting of a start-of-frame (SOF) flag 35 which is uniquely recognizable and marks the beginning of a frame relay frame. Header field 36 includes a virtual circuit identification which can be used at the various nodes of network 12 of FIG. 1 to control the routing of the frame relay frame 45 through network 12, using the frame handlers, such as frame handler 259 of FIG. 3. Following the data 37 is a trailer comprising a frame checking sequence (FCS) field 38, used to detect errors in the frame relay data 37, and an end-of-frame (EOF) flag 39, another uniquely recognizable code used to mark the end of the frame relay frame 45. User data, in whatever format and at whatever rate generated by the user, is encapsulated in one or more frame relay frames like frame 45 for transmission through the frame relay network. These frame relay frames are delivered through frame relay network 12 (FIG. 1) to a destination edge node, such as edge node 15, along a virtual circuit defined prior to its use and invoked in response to information in the address field 36. The destination edge node, in turn, delivers the user data to the appropriate user destination. The frame relay frame format can be used to deliver any information to any destination, including the delivery of network management major vectors to the network management system, if such internode transmission is required.

Figure 6:
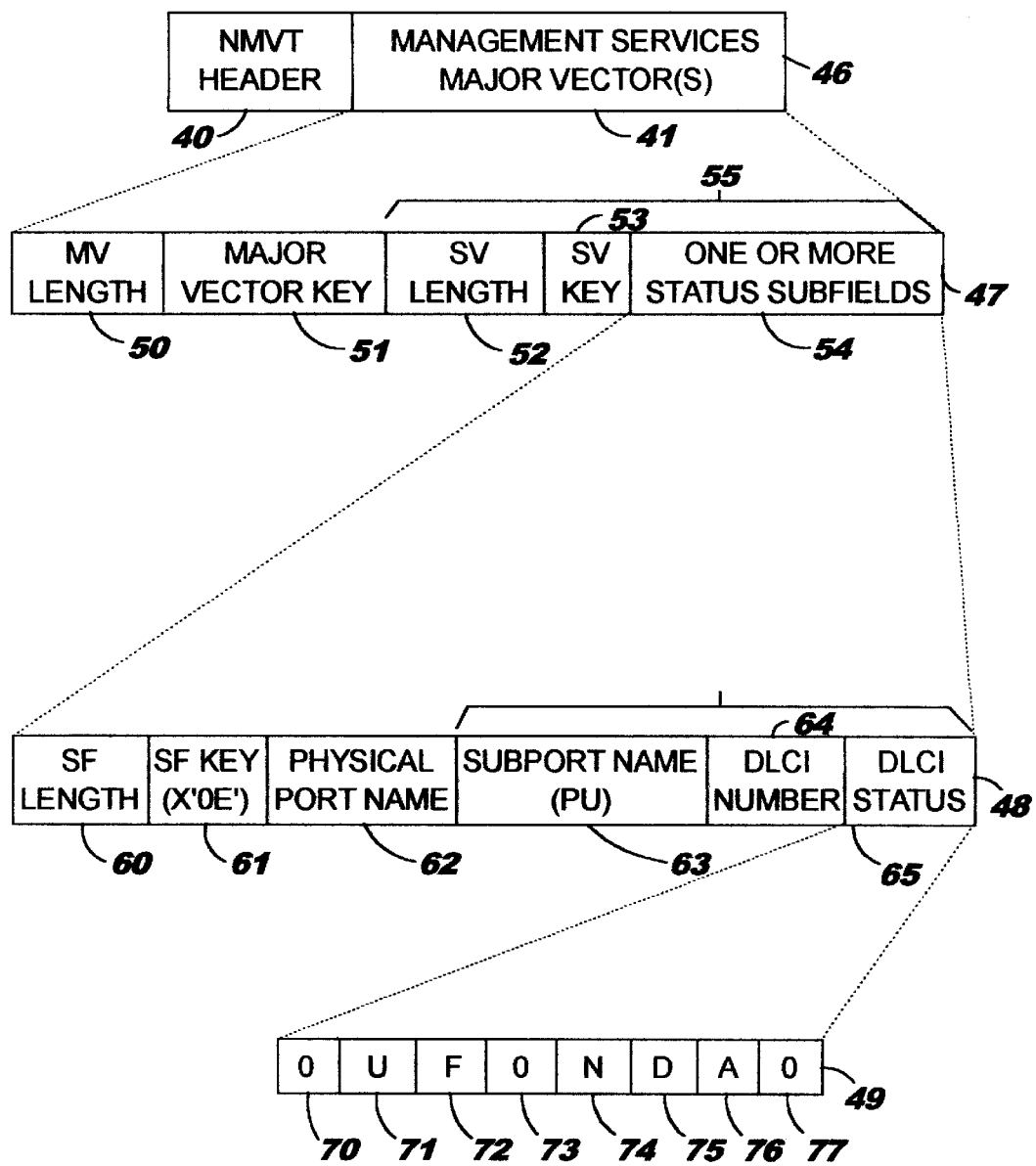
FIG. 6 shows a graphical representation of the data formats in accordance with the present invention for virtual circuit segment status vectors.

In FIG. 6 there is shown a graphical representation of the detailed data formats utilized for the transmission of network management data to network management system 11 of FIG. 1 (and system 225 of FIG. 2). In addition to user data, the frame relay frame format 45 of FIG. 5 can also be used to transmit network management information from the nodes of network 12 to the network management system 11 of FIG. 1 within the frame relay field 37. This network management information is generated at all of the nodes of the frame relay network to reflect the status of the virtual circuit segments and of the virtual circuit connections made at that node. Such network management data is organized into a network management major vectors 41 which, if transmitted on the frame relay network, embedded in a network management vector transport (NMVT) frame 46 in FIG. 6. The NMVT 46 comprises a header 40 which identifies the following as a major vector and hence specifies the predetermined format of the information. The major vector 41 contains all of the actual network management services data and is further subdivided into a plurality of subvectors and subfields. Major vector 41, in turn, is formatted as shown in format 47 into one or more subvectors 55 and a header including a major vector length field 50, containing the length of the entire major vector 47. Field 51 includes a key identifying the major vector contained in format 47. A list of some of the major network management vectors is shown in Table 1. The key field identifiers are hexadecimal numbers, denoted by the "X" preceding the number.

TABLE 1

Summary of Management Services Major Vectors

| Major Vector Key | Format Description |
| --- | --- |
| X'0000' | Generic Alert |
| X'0080' | Response Time |
| X'8080' | Response Time |
| X'1212' | Control Point Management Services Unit |
| X'1310' | Multiple Domain Support Message Unit |
| X'1311' | Multiple Domain Support Routing Information |
| X'1320' | Text Command |
| X'1321' | Partial Format Processing Method |
| X'1322' | Display Datastream |
| X'1323' | Context-Identified Values |
| X'1324' | Context Identifier Group |
| X'1325' | Context Identifier |
| X'1326' | Value Group |
| X'1327' | Character Value Descriptor |
| X'1328' | Value Processing Method |
| X'1329' | Value |
| X'132A' | Hexadecimal Value Descriptor |
| X'132B' | Nested Value Processing Method |
| X'1331' | Value Instance Identifier |
| X'1332' | Link Connection Subsystem Configuration Data |
| X'1532' | SNA Condition Report |
| X'1548' | FS Action Summary |
| X'1549' | Agent Unit of Work Correlator |
| X'154D' | Routing and Targeting Instructions |

The present invention contemplates additions to the X'0000' and the X"1332' major vectors of Table 1.

As shown in FIG. 6, the major vector 47 includes one or more subvectors 55 each of which also has a header comprising a length field, such as field 52, containing the length of the subvector, including the header, and a subvector key field 53 containing a key identifying the contents of the subvector. A list of some of the subvectors contained in major vectors X'0000' and X'1332' is shown in Table 2.

TABLE 2

Summary of Management Services Subvectors

| Subvector Key | Format Description |
| --- | --- |
| X'01' | Date/Time |
| X'04' | System Network Architecture Address List |
| X'05' | Hierarch/Resource List |
| X'10' | Product Set Identification |
| X'42' | Relative Time |
| X'52' | LCS Configuration Data |

The present invention contemplates new formats for and new uses of the LCS Configuration Data subvector X'52'.

The LCS Configuration subvector X'52' of Table 2 contains information concerning the status and configuration of the virtual circuit segments defined in the packet network 12 (FIG. 1). This LCS Configuration subvector X'52', in turn, can be divided into a plurality of subfields X'00' through X'FE'. The subfields for the LCS data link subvector X'52' of the X'1332' and X'0000' major vectors are identified in Table 3.

TABLE 3

Link Configuration Subsystem Data Common Subvector X'52' Contents

| Subfield Key | Format Description |
| --- | --- |
| X'01' | Port Address |
| X'02' | Remote Device Address |
| X'03' | Modem LCS Topology |
| X'04' | Local Device Address |
| X'05' | Modem LCS Correlation Number |
| X'06' | LCS Link Station Attributes |
| X'07' | LCS Link Attributes |
| X'08' | LPDA Fault LSL Descriptor |
| X'09' | Remote Telephone Number |
| X'0A' | Local Telephone Number |
| X'0B' | Adapter Number |
| X'0C' | Channel Number |
| X'0D' | CSS Link Configuration Data |
| X'0E' | Frame Relay DLCI Status |
| X'0F' | FRSE Subport Set Status |

The latter two of these subfields (X'OE' and X'OF') are herewith defined for the first time and form the basis for virtual circuit management in accordance with the present invention.

In FIG. 6, the format 48 illustrates the subfield format for subfield X'0E' used to transmit frame relay DLCI status information. Format 48 of FIG. 6 contains a header including a subfield length field 60 containing the length of the entire subfield, including the header. A subfield key field 61 contains the identification of the subfield, X'0E' in this case. The next field in format 48 is field 62, containing the name of the physical port corresponding to ports 204, 205, 210 and 212 in FIG. 2 and ports 251, 252, 263 and 264 in FIG. 3. A plurality of subport fields follows physical port name field 62, one for each subport defined in the port corresponding to field 62. In FIG. 2, for example, the status of subports A, B and C would be in the subfield corresponding to port 212, the status of subports D, E and F would be in the subfield corresponding to port 204, and so forth. Each of the subport fields includes a subport name field 63, a DLCI number field 64 and a DLCI status field 65. The subport name field 63 contains the subport identifier such as "A," "B," and so forth in FIG. 2. DLCI number field 64 contains the data link connection identifier corresponding to the subport name, such as "0," "16," and "18" of FIG. 2. Field 65 contains the status of the identified virtual circuit segment. This status field 65 is expanded in format 49, showing an eight bit status byte including status bits 70 through 77. The meaning of these status bits is summarized in Table 4.

TABLE 4

Frame Relay DLCI Status Field

| Bit No. | Bit No. (FIG. 6) | DLCI Status Description |
| --- | --- | --- |
| 0 | 70 | Reserved |
| 1 | 71 | Unsupported DLCI(s) in Adjacent Node |
| 2 | 72 | Resource Failure Associated with DLCI Status |
| 3 | 73 | Reserved |
| 4 | 74 | Previously Defined/New Connection |
| 5 | 75 | Connection Present/Not Present |
| 6 | 76 | Active/Inactive Connection |
| 7 | 77 | Reserved |

The "unsupported" bit 1 and the "failure" bit 2 are newly defined herewith and permit automatic network management by the system of FIG. 4, as will be described hereinafter.

Figures 7, 8:
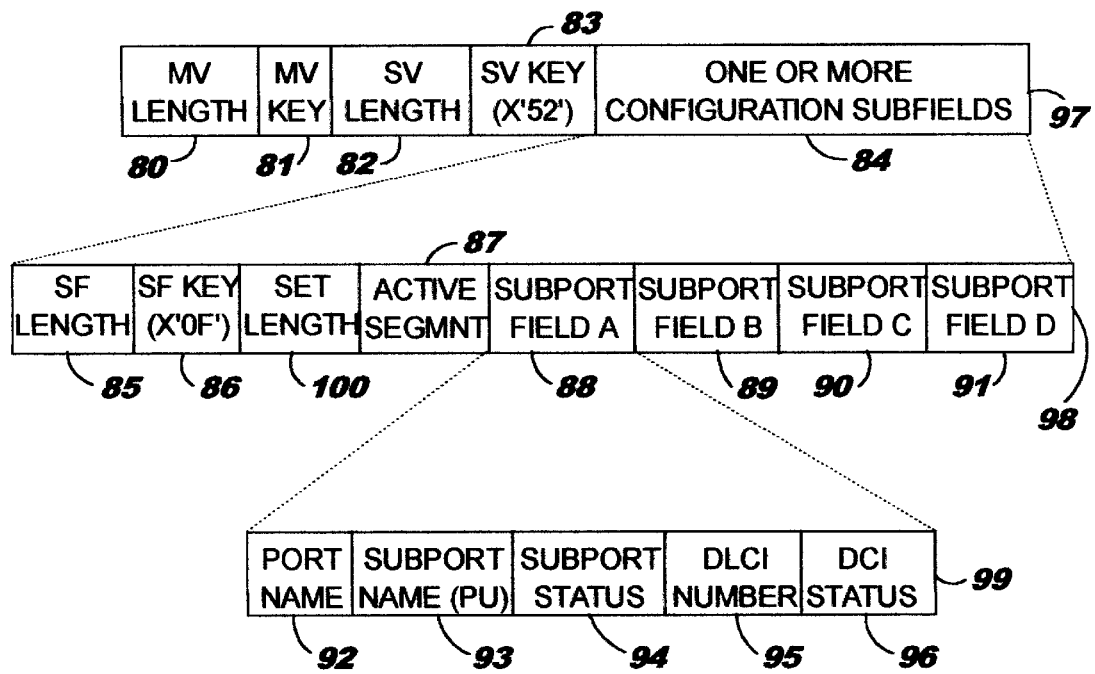
FIG. 7 shows a graphical representation of the data formats in accordance with the present invention for virtual circuit segment configuration vectors.
FIG. 8 shows an automation table entry for the network management system of FIG. 2 for controlling the management of a frame relay network.

In FIG. 7 there is shown a graphical representation of the configuation subvector formats. Format 97 corresponds to status subvector format 47 in FIG. 6 and includes a major vector length field 80, a major vector key field 81 (containing major vector key X'0000' or X'1332') a subvector length field 82, a subvector key field 83 (containing subvector key X'52') and one or more configuration subfields 84. One configuration subfield is expanded in format 98 comprising a subfield length field 85, subfield key field 86 (containing subfield key X'0F'), a set length field 100 containing the length of the entire configuration set, including the length field itself, an active segments field 87 containing the identifications of the subport pairs currently active, and four subport fields 88, 89, 90 and 91. It will be recalled with respect to FIG. 3 that redundancy can be provided in the virtual circuit assignments by assigning at least one substitute subport for each subport in the virtual circuit. The subfield format 98 of FIG. 7 identifies all four of the subports, A and B being the normal subports in the virtual circuit, subport C being a substitute for subport A and subport D being a substitute for subport B. In the face of failures, the substitute subports can be substituted for the normal subports and the currently active subports identified in field 87.

Each of subport fields 88–91 of format 98 can be expanded as shown in format 99. Format 99 comprises a port name field 92, containing the port name (251, 252, 263 or 264 in FIG. 3), a subport name field 93, containing the subport name ("M" to "R" in FIG. 3), a subport status field 94, containing the availability status of the subport, a DLCI number field 95, containing the DLCI number of the virtual circuit segment corresponding to the subport name in field 93 ("23," "24," "26," or "27" in FIG. 3), and a DLCI status field 96 containing a status byte identical to that shown in format 49 of FIG. 6 and Table 4. The configuration subfield is described in detail in Table 5.

TABLE 5

FRSE Subport Set Configuration

| Field (FIG. 7) | Description |
| --- | --- |
| 85 | Length of the FRSE Subport Set Subfield |
| 86 | Key (X'0F') |
| 100 | Length of the Subport Set Configuration |
| 87 | Active Segments Indicator |
| 92 | Port Name, (FIG. 3, 251, 252, 263, 264) |
| 93 | Subport Name (Subport A) |
| 94 | Subport Status (Subport A) |
| 95 | DLCI Number (Subport A) |
| 96 | DLCI Status (Subport A) |
| | Repeat Fields 92, 93, 94, 95 and 96 for Subports B, C, and D (Fields 89, 90, 91, FIG. 7) |

It should be noted that, in the frame relay network terminology, only the 976 DLCIs numbered from 16 to 991 are available to identify active connections, the balance of the DLCIs being reserved for special purposes. Moreover, as noted above, DLCI "0" is reserved for interchanging status messages between the local management processes (201, 207 and 210 in FIG. 2) responsible for managing the actual operation of their respective nodes. If the status or configuration of the network changes, either from the activation or deactivation of a virtual circuit, the addition, deletion or other change in a PVC, or the occurrence of detected error conditions, status and configuration NMVTs are generated in the nodes and transmitted to the network management system, over the frame relay network if necessary. Such status and configuration NMVTs are collected at the network management system, processed, and management decision made and carried out based on that status and configuration data. The status and configuration information shown in FIGS. 6 and 7 is therefore originated at each of the nodes of the packet network 12 of FIG. 1 and delivered to the network management system of FIG. 4. The difference between an X'1332' status vector and an X'0000' alert vector is that the status vector is used to report normal changes in status of the various connections of the network, while the alert vectors are used to report error conditions. The internal format of these vectors, however, are identical and are as illustrated in FIGS. 3 and 4.

Returning to the DLCI status byte format 49 of FIG. 6, of the eight bits 70–77, three are reserved (70, 73 and 77), three (74, 75 and 76) have been described in the ANSI standards T1.617-1991 and T1.618-1991 ( and the corresponding international CCITT standards COM X1-R 63-E and COM X1-R 133-E). Two of these status bits (71 and 72) are newly defined for use in the major vectors in accordance with the present invention. The "U" bit is used to indicate whether or not one or more DLCIs are defined in the adjacent node to which the connection is extended. As noted above, the frame relay standards recognize 976 DLCIs (DLCIs 16-991). Many implementations of the frame relay nodes of the network 12 of FIG. 1, on the other hand, are designed to handle a lesser number of DLCIs. If a local node is unable to handle one or more DLCIs defined in an adjacent node, this condition is reported to the network management system by setting the "U" bit 71 in the status field 49 of DLCI "0". This "U" bit (bit 1) can therefore be used to detect errors in the assignment of virtual circuit segments which, in fact, cannot be supported in adjacent nodes where one end of the virtual circuit segment is undefined at the same time that the other end is defined.

The "F" bit (bit 72 in FIG. 6) is used to indicate that a DLCI in use by one node has been reported as inactive by the adjacent node, indicating that a hardware failure or logical fault has occurred with respect to the defined virtual circuit segment and hence an error recovery procedure is necessary to correct the affected virtual circuit segment. The detection and reporting of such errors is difficult and the availability of a status bit reserved for this purpose increases the efficiency of error responses.

The three prior art status bits include the "A" bit (bit 76 in FIG. 6), indicating whether the segment is currently active or not, the "D" bit (bit 75), indicating whether a virtual circuit utilizing this segment is currently defined, and the "N" bit (bit 74), indicating whether the segment was previously defined, or is a newly defined segment of a virtual circuit. This status information is generated at the various nodes of the packet network 12 of FIG. 1 and is delivered to the network management system 11 via the major vector of FIG. 6 as well as to the adjacent node via status messages delivered over DLCI "0".

Using the formats shown in FIGS. 6 and 7, detailed information about the status of the various virtual circuit segments of the frame relay network 12 of FIG. 1, can be forwarded to the network management system of FIG. 4 via status subfield X'0E'. Similarly, the status of the various virtual circuit segment interconnections can likewise be forwarded to the network management system of FIG. 4 via configuration subfield X'0F'. This information is used in network management system 11 (FIG. 1) to control the network 12, using the automation table 29 of FIG. 4. To illustrate this use of the automation table 29, a portion of the automation table is reproduced in FIG. 8. This automation table entry is used to parse the subvector X'52' in order to initiate the execution of an appropriate command.

In the automation table entry of FIG. 8, the network management major vector is examined to identify the status or configuration subvector of a generic alert (X'0000') vector or a status (X'1332') vector. In FIG. 8, the variable "MSU-SEG" represents a segment of a received major vector. The segment is identified parenthetically by the major vector key, the subvector key and the subfield key, separated serially by periods (e.g., 0000.52.07). This segment identifier can then be followed by a byte number to identify a single byte in the segment identified. Thus, the first line of FIG. 8 compares the seventh byte of the X'07' subfield of the X'52' subvector of the X'0000' (generic alert) major vector to the hexadecimal value "01". This test determines that the major vector came from the frame relay system. The second line of FIG. 8 makes the same comparison with the same byte of the same subvector of the X'1332' major vector. If either of these vector segments pass this test, the next four lines are used to determine if the X'0E' and X'0F' status and configuration subfields are not empty (-="). If these tests are passed, the "BEGIN . . . END" sequence is entered where further comparisons of selected bytes of the status and configuration subvectors are compared to various hexadecimal values and a test is made to determine the availability of a resource hierarchy list (HIER) associated with that major vector. If all of these tests are met, a command is executed ('EXEC (CMD)) to carry out the desired network management procedure. Each automation table entry like the entry in FIG. 8 is contained in the automation table 29 of FIG. 4 and permit extensive and detailed control over the operation and configuration of the frame relay network 12 of FIG. 1. This operation and control can be more readily seen in the flow charts of FIGS. 9 and 10.

Figure 9:
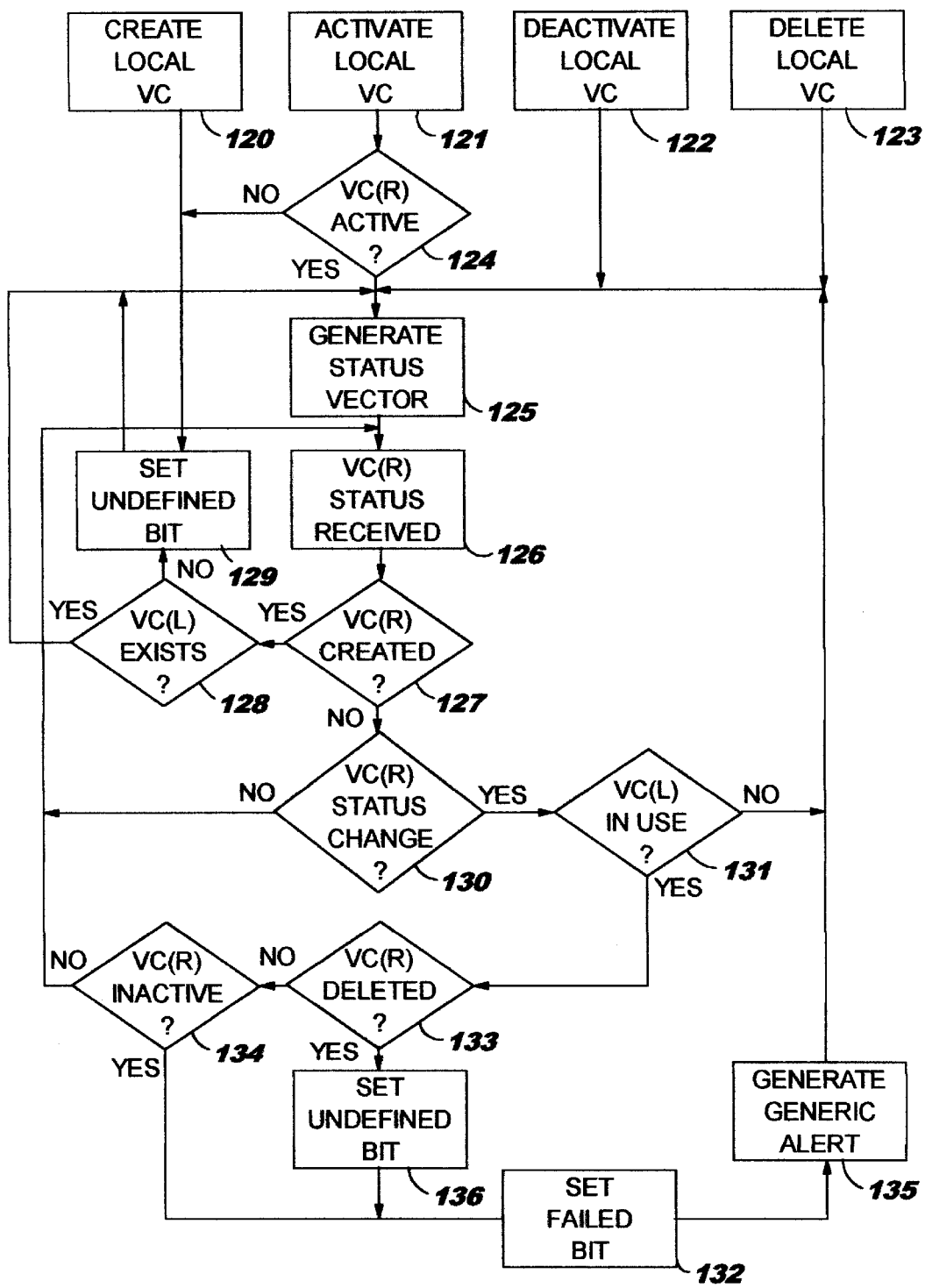
FIG. 9 shows a flow chart of the processes for creating network management major vectors at the nodes of a frame relay network and used by the network management system of the present invention.

In FIG. 9 there is shown a detailed flow chart of the procedures for generating the generic alert and status major vectors at the various nodes of the frame relay network 12 of FIG. 1. That is, the procedures of FIG. 9 are implemented, preferably by programming a digital computer, at each and every node of the frame relay network 12 of FIG. 1. Moreover, the procedures of FIG. 9 are performed for each and every virtual circuit segment defined for the local node. Starting at one of boxes 120, 121, 122 or 123, a change in any local virtual circuit (VC) at any node triggers the procedures of the flow chart of FIG. 9. For example, if a local virtual circuit segment is deactivated in box 122, or if the local virtual circuit segment is deleted in box 123, box 125 is entered to generate a new network management status vector (Key=X'1332'). Thereafter, the system awaits the receipt of a status message from the adjacent node in box 126. The notation "VC(L)" in FIG. 9 indicates a local virtual circuit status while "VC(R)" indicates a virtual circuit status received from an adjacent node, as shown on DLCI "0" in FIG. 2.

Returning to FIG. 9, if an existing local virtual circuit is activated in box 121, decision box 124 is entered to determine if the remote end of the same virtual circuit segment is likewise active. If it is, box 125 is entered to generate a new status vector to reflect the change. If a local virtual circuit is newly created in box 120, the process awaits the reception of a status message from the remote adjacent node in box 126.

When a new status message is received from a remote node in box 126, decision box 127 is entered to determine if a new virtual circuit segment has been created at the remote node. If a new virtual circuit has been created, as determined by decision box 127, then decision box 128 is entered to determine if the corresponding virtual circuit segment exists locally. If the virtual circuit already exists locally, box 125 is re-entered to generate a new status vector to reflect the creation of this new virtual circuit. If the local virtual circuit segment does not already exist, as determined by decision box 128, box 129 is entered to set the undefined ("U") bit for that DLCI. This means that the virtual circuit segment cannot be used and that some corrective action is required to correct the assignment of that segment.

If it is determined in decision box 127 that the received status message indicates a new virtual circuit segment was not created at the remote node, decision box 130 is entered to determine if there is any change in the virtual circuit status at the remote node. If there is no change, box 126 is re-entered to await the reception of the next status message from the adjacent remote node. If there is a change in the status of the virtual circuit at the remote node, decision box 131 is entered to determine if the local virtual circuit segment for which the status change is indicated is itself in use. If not, box 125 is re-entered to generate a new status vector for this node to detail the new status. If the local virtual circuit segment is in use, as indicated by decision box 131, decision box 133 is entered to determine if the change in the remote segment status indicates that the virtual circuit segment was deleted. If so, box 136 is entered to set the undefined ("U") bit. Box 132 is then entered to set the failed "F" bit, and box 135 is entered to generate a generic alert. That is, if local node is using a segment while the remote node indicates that the segment was deleted, something is seriously wrong and must be corrected. Boxes 136 and 132 are therefore entered to set the "U" and "F" status bits and then box 135 is entered to generate a generic alert (Key= X'0000'). The system then also generates a new status vector in box 125 and then awaits the reception of the next remote status message in box 126.

If decision box 130 determines that there is no change in the status of a segment, then box 126 is re-entered to await the next status message. If it is determined in decision box 133 that the remote virtual circuit segment has not been deleted, decision box 134 is entered to determine if the remote segment is marked as inactive. If so, box 132 is entered to set the failed bit and then box 135 is entered to generate a generic alert. Since the local status indicates that this segment is in use (by decision box 131), the remote indication that it is inactive indicates a failure and a generic alert is appropriate. If it is determined in decision box 134 that the remote status change does not indicate an inactive status, box 126 is re-entered to await the reception of the next status message from the remote node.

It can be seen that the process of FIG. 9 detects failures and lack of support for permanent circuit segments (DLCIs) at adjacent nodes, utilizing the status messages exchanged between the adjacent nodes over DLCI "0". Failures and inconsistent status indications at the opposite ends of the same virtual circuit segment cause the "F" or "U" bit to be set, initiating the transmission of generic alerts which can be used to correct the error or failure. At the same time, the detailed status information concerning all of the virtual circuit segments of the network can be stored in the data cache 26 of the network management system of FIG. 4, selectively displayed on the workstation 25 and utilized to the advantage of management personnel to control network 12 of FIG. 1.

Figure 10:
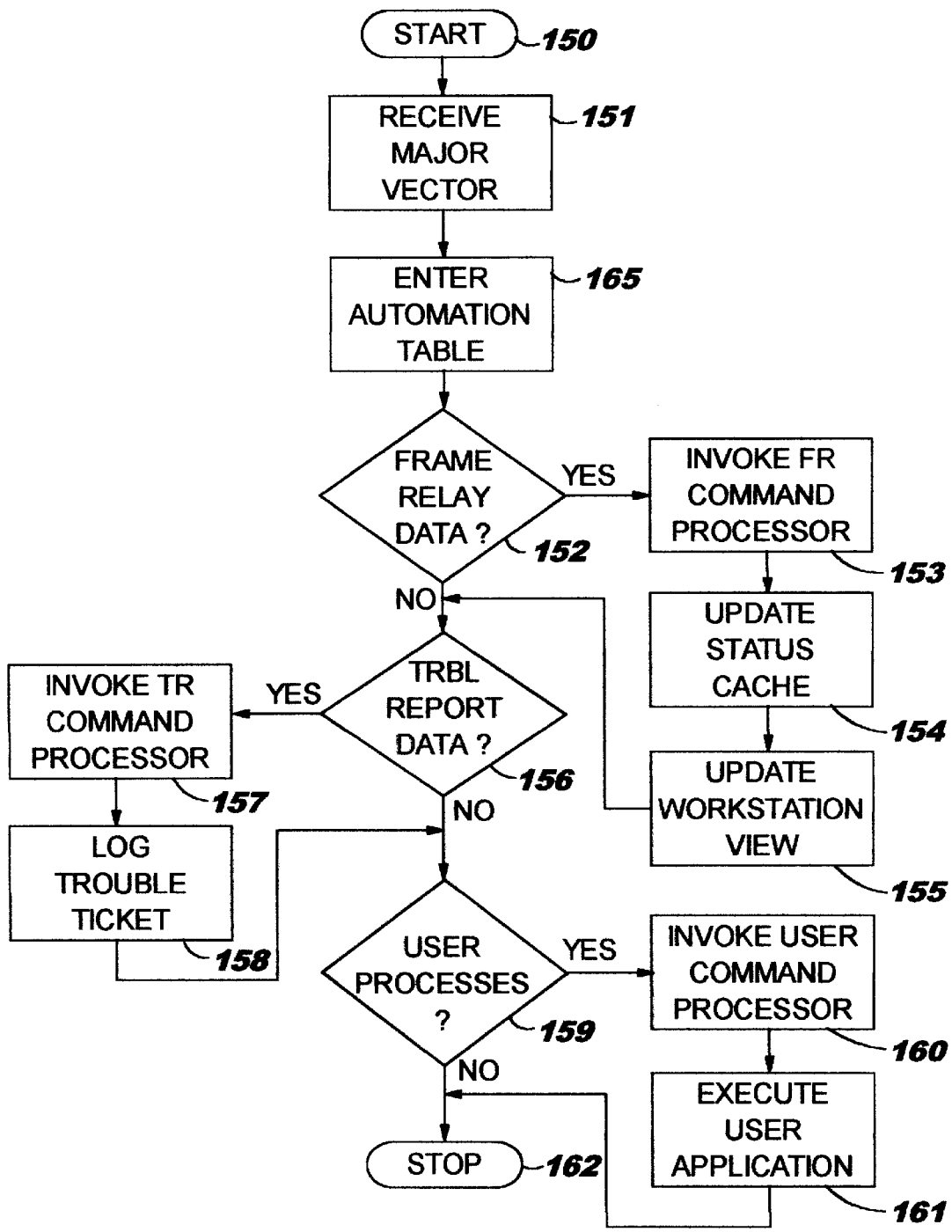
FIG. 10 shows a flow chart of the processes for utilizing the network management major vectors generated in the flow chart of FIG. 6 in the network management system of FIG. 4.

In FIG. 10 there is shown a flow chart of the processing of the management services major vectors received at the network management system of FIG. 4. Starting at start box 150, box 151 is entered where the major vector is received. The major vector is then passed on to the automation table 29 (FIG. 4) to determine the appropriate response to the received information. The automation table provides the code to perform a plurality of tests on the received data, illustrated by decision boxes 152, 156 and 159. In response to these tests, specific actions are taken, as illustrated by boxes 153, 154, 155, 157, 158, 160 and 161. These tests and responses are to be taken as illustrative only and it is to be understood that many other tests and many other responses are possible. The ones illustrated in FIG. 10 are deemed to be representative.

In FIG. 10, the received data is forwarded to decision box 152 where it is determined whether the received vector includes frame relay network status or configuration data. If yes, box 153 is entered where a command processor is invoked to operate in response to the specified changes in status or configuration, as suggested in the automation table entry of FIG. 8. The new network status or configuration information is also used, in box 154, to update the status cache 26 of FIG. 4. The updated status cache, in turn, can be used in box 155, to update the workstation displays which display this status information. Operating personnel can, in response to this status display, manually enter commands on the screen of the workstation 25 to manually control the network. The workstation can, of course, also be used to display the network problems, the recommended solutions to anticipated problems and the particular commands useful in implementing these solutions, thereby providing a network management tool which can be tailored to the particular network with which it operates.

Whether or not frame relay network status information is present in the received vector, decision box 156 is entered to determine if the vector is a generic alert containing trouble (failure) information. If so, box 157 is entered to invoke a trouble ticket command processor 157 also forming a portion of the automation table 29 of FIG. 4 and permitting standard trouble responses such as logging a trouble ticket in box 158. Automatic problem recovery commands can also be invoked from the automation table in box 157 to initiate automatic trouble recovery procedures.

Whether or not trouble information is contained in the received vector in box 151, decision box 159 is entered to determine whether or not additional user processes have been defined. If so, box 160 is entered to invoke the user command processor specified in automation table 29. In response to the invocation of the user command, box 161 is entered to execute the invoked user command. The script for executing this user command can be tailored to fit the particular needs of this user, the particular topology of this network and the particular physical resources used to implement the network. The vector processing terminates in stop box 162.

It can be seen that the generic network management system implemented in FIGS. 4 and 10 forms a platform which can be used in a wide variety of high speed packet communications networks. The modifications necessary to accommodate any particular network can be implemented by reprogramming the host computer and preparing appropriate scripts in the automation table 29 of FIG. 4. The balance of the organization and implementation of the network management system of the present invention is generic to all network realizations and can be used for a large number of packet communications networks.

It should also be clear to those skilled in the art that further embodiments of the present invention may be made by those skilled in the art without departing from the teachings of the present invention.

What is claimed is:

1. A packet communications network comprising a plurality of packet switching nodes interconnected by packet transmission data links, means at each of said packet switching nodes for generating network management vectors for reporting the status of virtual circuit segments defined for said data links and the configuration of the interconnections between said packet switching nodes, a network management system for receiving said network management vectors, means located in said network management system and responsive to said network management vectors for managing said packet communication network, said means for managing including means for storing the current status of said virtual circuit segments and the configuration of said interconnections, and means responsive to the current status from said means for storing for selectively displaying portions of said current status and configuration.

2. The packet communications network according to claim 1 wherein said means for managing further comprises means for detecting specific subportions of the information in said network management vectors, and means responsive to the content of the specific subportions detected by said means for detecting subportions for utilizing said specific subportions to modify said network.

3. The packet communications network according to claim 1 wherein said means for managing further comprises means for detecting user command processes in response to said network management vectors, and means responsive to the results from said means for detecting commands for invoking user command processing means for executing user applications.

4. In a packet communications network having a plurality of packet switching nodes interconnected by a plurality of data transmission links including a plurality of virtual circuit segments, a packet network management system comprising automated means for representing the status of the plurality of virtual circuit segments defined on said data transmission links at each of said nodes, said automated means for representing status comprising means for indicating a virtual circuit segment which is supported by an active node adjacent to said each of said nodes, means for indicating a virtual circuit segment which is not supported by an active node adjacent to said each of said nodes, and means for indicating a virtual circuit segment which is in use by said each of said nodes but which is indicated as being inactive in a node adjacent to said each of said nodes.

5. The packet network management system according to claim 4 further comprising means at each of said packet switching nodes for generating a major status vector containing the status of each virtual circuit segment defined at that node for transmitting data packets.

6. The packet network management system according to claim 4 further comprising means at each of said packet switching nodes for generating a major status vector containing the configuration of the interconnections between the virtual circuit segments terminating at that node and assigned for the transmission of data packets to and from that node.

7. The packet network management system according to claim 4 further comprising means at each of said packet switching nodes, responsive to failure conditions at that node, for generating a major status vector containing the status of the one or more virtual circuit segments affected by said failure conditions.

* * * * *